Figure 1:
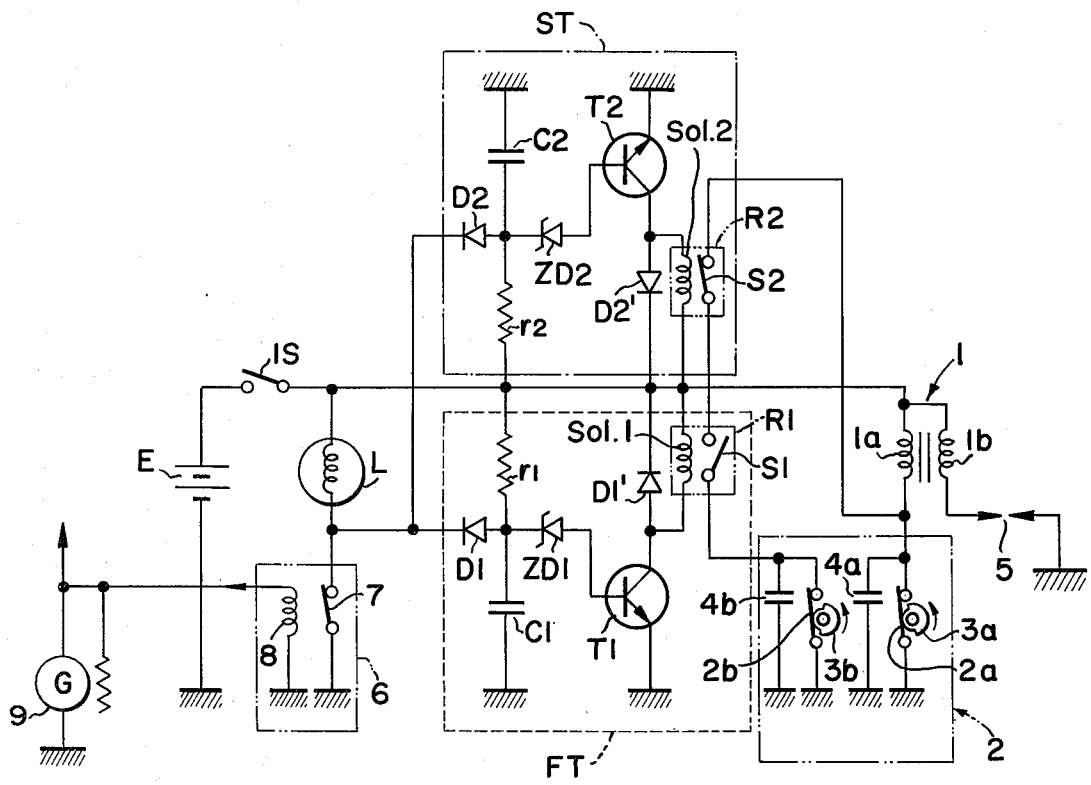

United States Patent [19]
Yoshizu et al.

[11] 3,938,485

[45] Feb. 17, 1976

[54] IGNITION SYSTEM FOR AN INTERNAL COMBUSTION ENGINE

[75] Inventors: Koji Yoshizu; Kingo Okitsu, both of Hiroshima, Japan

[73] Assignee: Toyo Kogyo Co., Ltd., Japan

[22] Filed: Apr. 17, 1974

[21] Appl. No.: 461,801

[30] Foreign Application Priority Data
Apr. 24, 1973 Japan.......................... 48-48878[U]

[52] U.S. Cl. .......................... 123/117 R; 123/148 E
[51] Int. Cl.²...................... F02P 5/04; F02N 17/00
[58] Field of Search ...................... 123/117 R, 148 E

[56] References Cited
UNITED STATES PATENTS

| | | | |
|---|---|---|---|
| 3,408,993 | 11/1968 | Chavis............................ | 123/148 E |
| 3,516,396 | 6/1970 | Lawson .......................... | 123/148 E |
| 3,779,219 | 12/1973 | Saita .............................. | 123/117 R |

Primary Examiner—Wendell E. Burns
Assistant Examiner—James W. Cransin, Jr.
Attorney, Agent, or Firm—Fleit & Jacobson

[57] ABSTRACT

Ignition system for an internal combustion engine including a pair of breaker contacts parallely connected with the primary coil of ignition coil means, one providing a normal ignition timing and the other a delayed timing, and a pair of time delay means, one having a normally closed contact and providing a predetermined time delay, and the other having a normally open contact and providing a longer predetermined time delay, said contacts in the time delay means being disposed in series between the primary coil and said other of the breaker points, whereby there is provided a normal ignition timing for a certain period after engine start, then a delayed ignition timing for a further certain period and thereafter again the normal ignition timing.

4 Claims, 2 Drawing Figures

IGNITION SYSTEM FOR AN INTERNAL COMBUSTION ENGINE

The present invention relates to an ignition system for an internal combustion engine and more particularly to ignition control means therefor.

Recently, there have been proposed to provide various means for cleaning exhaust gas of an automobile engine. One of such means is a proposal to retard engine ignition timing during engine starting and warming-up periods. This proposal is made in view of the fact that the amount of air polluting substances such as hydrocarbon (HC) and carbon monoxide (CO) is increased during such periods, and therefore intended to increase the temperature of the exhaust gas by making combustion continue until the gas is introduced into the exhaust system so as to enhance the operation of an exhaust gas cleaning device such as a thermal reactor or a catalytic reactor. This proposal has been found effective to reduce the amount of unburnt constituents in the engine exhaust gas, however, it has also been experienced that retarding the ignition timing immediately after engine start has an adverse effect on the starting characteristics of the engine.

The present invention therefore has an object to eliminate the aforementioned problem of prior art.

Another object of the present invention is to provide means for retarding ignition timing during engine starting and warming-up periods without affecting engine starting characteristics.

The above and other objects of the present invention are achieved, in accordance with the present invention, by providing an ignition system for an internal combustion engine comprising ignition coil means including a primary and a secondary coils, ignition plug means connected with said secondary coil of the ignition coil means, electric power supply means connected with one end of said primary coil of the ignition coil means, and breaker means connected at one end with the other end of the primary coil, the other end of said breaker means being grounded, the improvement comprising first time delay means including a normally open switch contact which is closed after a predetermined time when the time delay means is energized, second time delay means including a normally closed switch contact which is opened after a second predetermined time which is longer than said first mentioned predetermined time when the second time delay means is energized, means for detecting that the engine is started and producing an engine start signal, means for receiving said engine start signal from said detecting means and simultaneously energizing the first and second time delay means, said breaker means including at least two parallely connected breaker contacts, one of the contacts being opened at a normal engine ignition timing and the other being opened at a timing later than said one breaker contact by a predetermined time, said switch contacts in the first and second time delay means being disposed in series between said primary coil of the ignition coil means and said other breaker contact, whereby ignition takes place at the normal ignition timing during said first mentioned predetermined time after engine start, then at the delayed ignition timing during said second predetermined timing and thereafter again at the normal ignition timing. In a practical design, the first time delay means may provide a time delay of about three seconds and the second time delay means may provide a time delay of about twenty-six seconds. According to a preferred mode of the present invention, a generator for an automobile on which the engine is equipped may be used as the engine start detecting means so that the output current of the generator is utilized as the signal for energizing the time delay means. A relay may be inserted into energizing circuit of the time delay means and connected with the output circuit of the generator.

Figure 2:
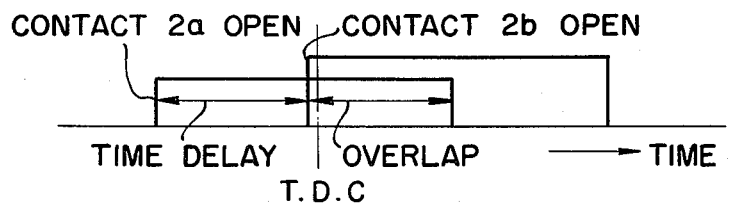

The above and other objects and features of the present invention will become apparent from the following descriptions of a preferred embodiments of the present invention taking reference to the accompanying drawings, in which;

FIG. 1 is a schematic wiring diagram of the ignition circuit in accordance with a preferred embodiment of the present invention; and, FIG. 2 is a diagrammatical illustration of the opening timing of breaker contacts.

Referring to the drawings, particularly to FIG. 1, there is shown an engine ignition circuit which includes an ignition switch IS which is disposed between an electric power supply source, such as a battery E of an automobile, and an ignition coil device 1 having a primary coil $1a$ and a secondary coil $1b$. The primary coil $1a$ is connected with a breaker device 2 which includes a pair of parallel normally closed contacts $2a$ and $2b$ for normally grounding the associated end of the primary coil $1a$. The breaker contacts $2a$ and $2b$ are cyclically actuated by cams $3a$ and $3b$, respectively, which are driven by an internal combustion engine with which the ignition circuit is associated. The breaker device 2 has capacitors $4a$ and $4b$ which are disposed parallely with the breaker contacts $2a$ and $2b$, respectively, for the purpose well known in the art. The secondary coil $1b$ of the coil device 1 is connected with an ignition plug 5.

According to a feature of the present invention, there is provided a first time delay circuit FT which includes a resistor $r_1$ connected at one end with the power supply source E through the ignition switch IS. The other end of the resistor $r_1$ is grounded through a capacitor C1. The time delay circuit FT further includes a transistor T1 which has a base connected through a Zener type diode ZD1 with said other end of the resistor $r_1$. There is also provided in the circuit FT a relay R1 including a normally open switch S1 and a solenoid Sol. 1. The solenoid Sol. 1 is connected between the power supply line and the collector of the transistor T1. The emitter of the transistor T1 is grounded. The base of the transistor T1 is also connected through a diode D1 and an indicating light L with the power supply line at the downstream side of the ignition switch IS. In the drawing, the reference D1' designates a diode disposed in parallel with the solenoid Sol. 1 of the relay R1.

There is also provided a second time delay circuit ST which is similar to the first circuit FT except that the switch S2 of the relay R2 is a normally open type and adapted to be closed by a solenoid Sol 2. Therefore, corresponding parts in the second circuit ST are designated by the same references as in the first circuit FT with an additive 2 as compared with the additive 1 in the first circuit FT. The indicator light L is grounded through a switch contact 7 of a relay 6 which includes a solenoid 8 connected with an output circuit of a generator 9. The generator is driven by the engine with which the ignition circuit is associated, so that is produces electric voltage when the engine has started to run through combustion. In each of the time delay circuits FT and ST, the delay time is determined by the values of the resistor $r_1$ or $r_2$ and the capacitor C1 or C2. The time constant of the first circuit FT is smaller than that of the second circuit, and the contacts S1 and S2 of the relays R1 and R2 in the circuits FT and ST are disposed in series between the primary coil 1a and the second breaker contact 2b. Further, in the ignition system, the cams 3a and 3b are so designed and interrelated that, as shown in FIG. 2, the breaker contact 2a is opened at a predetermined time before top dead center of the engine piston stroke while the breaker contact 2b is opened after a certain time delay from the opening of the contact 2a. Since the contact 2a remains open for a certain period, there is an overlap period in the operation of the breaker contacts 2a and 2b.

In operation, when the ignition switch IS is closed and the engine is not started or in other words, when the engine is not running through combustion of fuel, the contact 7 of the relay 6 remains closed so that the indicator light comes on indicating that the generator G is not in operation. When the engine is started and engine combustion takes place, electric voltage is produced by the generator 9 so that a current is supplied to the solenoid 8 of the relay 6 to open the contact 7. Thus, the indicator light is turned off and the capacitors C1 and C2 are changed from the power source E through the resistors $r_1$ and $r_2$, respectively. During this period, since the contact S1 is opened, the operation of the breaker point 2b does not have any effect on the ignition coil 1 and the ignition timing is determined only by the operation of the breaker contact 2a. Thus, the ignition takes place at a normal timing. After a predetermined time which is determined by the values of the resistor $r_1$ and the capacitor C1, for example three seconds, the capacitor C1 is charged to a level sufficient to turn the transistor T1 on. Thus, current is allowed to flow through the solenoid Sol. 1 whereby the contact S1 is closed. Thus, a grounding circuit of the primary coil 1a is completed through the normally closed contact S2, the now closed contact S1 and the breaker contact 2b, so that the operation of the first breaker contact 2a can no longer have any effect on the ignition coil 1. Therefore, the ignition timing is determined by the operation of the second breaker contact 2b and the ignition takes place at a delayed timing. After a further time delay, for example 26 seconds, the capacitor C2 is charged to a level sufficient to turn the transistor on whereby the solenoid Sol. 2 is energized to open the contact S2. Thus, the second breaker contact 2b is again brought out of connection with the primary ignition coil 1a so that the ignition timing is determined by the first breaker contact 2a.

From the above description, it will be apparent that the present invention provides novel means for controlling ignition timing of an engine during engine start and warm-up periods. According to the present invention, an engine is started with a normal ignition timing so that possibility of failure of engine start will substantially be eliminated. Further, after a predetermined time of the engine start, the ignition timing is retarded during a certain warm-up period whereby the amount of air polluting constituents in the engine exhaust gas can be remarkably decreased.

Although the invention has been shown and described with reference to a preferred embodiment, it should be noted that the invention is in no way limited to the details of the illustrated arrangements but changes and modifications may be made without departing from the scope of the appended claims.

We claim:

1. An ignition system for an internal combustion engine having ignition coil means including a primary and a secondary coil, ignition plug means connected with the secondary coil of the ignition coil means, an electric power supply means connected with one end of the primary coil of the ignition coil means, and breaker means connected at one end with the other end of the primary coil, the other end of the breaker means being grounded, the breaker means including at least two breaker contacts connected in parallel to the other end of the primary coil, one of the contacts being opened at a normal engine ignition timing and the other being opened at a timing later than the one breaker contact by a preselected time to retard engine ignition, comprising: a first time delay circuit means including a normally open switch contact means, means for connecting said normally open contact means to the power supply to energize said normally open switch contact means for closing same after a first predetermined time delay; a second time delay circuit means including a normally closed switch contact means, means for connecting said normally closed contact switch means to the power supply to energize said normally closed switch for opening same after a second predetermined time delay, said second predetermined time delay being longer than said first predetermined time delay; means for detecting that the engine is started and producing an engine start signal; and means for receiving said engine start signal from said detecting means and simultaneously energizing said first and second time delay circuit means, said switch contact means of said first and second time delay circuit means being disposed in the series between the primary coil of the ignition coil means and the other breaker contact, whereby after engine start, said first and second circuit means are simultaneously energized and the primary coil is connected in a series with the one breaker contact to produce engine ignition at the normal ignition timing during said first predetermined time delay after which said normally open contact means is closed to establish a series connection between the primary coil and the other breaker contact to produce engine ignition at a delayed timing for a time until said second predetermined time delay has elapsed, which time is the difference between said first and second predetermined time delays, and thereafter said normally closed switch contact means is opened to again establish a series connection between the primary coil and the one breaker contact to again produce engine ignition at the normal ignition timing.

2. Ignition system in accordance with claim 1 in which each of said time circuit delay means includes an R-C circuit, a transistor, and a solenoid for actuating an associated breaker contact when energized, each said solenoid being connected at one end with the power supply means, the other end of each said solenoid being grounded through said transistor which is turned on by means of said R-C circuit.

3. Ignition system in accordance with claim 2 which further includes a grounding line having a relay disposed therein and connected in parallel with said capacitor of said R-C circuits in each of said time delay circuit means, said relay being energized by said engine start signal from the detecting means.

4. Ignition system in accordance with claim 1 in which said detecting means is a generator which is driven by the engine with which the system is associated.

* * * * *